3,407,236
FLUOROALKYL ORTHOESTERS

John Jefferson Porter, Clemson, S.C., assignor to American Cyanamid Company, Stamford, Conn., a corporation of Maine
No Drawing. Filed Aug. 12, 1964, Ser. No. 389,222
4 Claims. (Cl. 260—615)

This invention relates to a new class of polyfluoroalkyl-orthoesters. More particularly, it relates to tris-(polyfluoroalkyl)-orthoformates of the formula:

(I)      $[X(CF_2)_nCH_2O]_3CH$ wherein X is H or fluorine, and $n$ is a whole number from 1 to 20.

The above orthoformates have utility as intermediates in the preparation of other organic compounds, special lubricants, solvents and fluoro-alkylating agents.

The tris(polyfluoroalkyl)-orthoformates of this invention can be prepared by reacting an alkali metal salt of the corresponding polyfluoro alcohol with chloroform, according to the equation:

$$3X(CF_2)_nCH_2OMe + CHCl_3 \rightarrow$$
$$[X(CF_2)_nCH_2O]_3CH + 3MeCl$$

where X and $n$ are as above and Me is an alkali metal.

The alkali metal salts of the polyfluoro alcohols are prepared by reacting the polyfluoro alcohol directly with the alkali metal or, preferably, by reacting the alcohol with an alkali metal lower alcoholate, such as sodium methylate, and removing the regenerated lower alcohol by distillation.

The polyfluoro alcohols have the formula:

(II)      $X(CF_2)_nCH_2OH$ where X and $n$ have the meaning indicated above.

Representative alcohols of Formula II where X is hydrogen are 1H,1H,3H-tetrafluoro-1-propanol, 1H,1H,-7H-dodecafluoro-1-heptanol, 1H,1H,9H-hexadecafluoro-1-nonanol, 1H,1H,11H,eicosafluoro-1-undecanol, 1H,1H,-13H-tetracosafluoro-1-tridecanol, 1H,1H,21H-tetracontafluoro-1-heneicosanol (21 carbons, 40 fluorines), etc.

Representative alcohols of Formula II where X is fluorine are 1H,1H,trifluoroethanol, 1H,1H-pentafluoro-1-propanol, 1H,1H-heptafluoro-1-butanol, 1H,1H-nonafluoro-1-pentanol, 1H,1H-undecafluoro-1-hexanol, 1H,1H-pentacosafluoro-1-tridecanol, etc.

Sodium and potossium are the preferred alkali metals for use in forming the alkali metal alcoholates.

The reaction between the alkali metal salt of the polyfluoro alcohol and chloroform is carried out at a temperature between 100° and about 200° C., preferably between 125° and 175° C.

The reaction can be carried out using an excess of the fluoro alcohol as the solvent medium, or an inert solvent can be used. Such inert solvents include ether, tetrahydrofuran, dioxane, etc.

The reaction is finished when the theoretical amount of alkali metal salt, e.g., sodium chloride, has precipitated.

The ortho-formates of Formula I where X is hydrogen include tris(1H,1H,3H-tetrafluoropropyl) - orthoformate, tris(1H,1H,7H - dodecafluoroheptyl) - orthoformate, tris-(1H,1H,9H - hexadecafluorononyl) - orthoformate, tris-(1H,1H,11H - eicosafluoroundecyl) - orthoformate, tris-(1H,1H,13H-tetracosafluorotridecyl)-orthoformate, tris-(1H,1H,21H-tetracontafluoroheneicosyl)-orthoformate.

The orthoformates of Formula I where X is fluorine include tris(1H,1H - trifluoroethyl) - orthoformate, tris-(1H,1H-pentafluoropropyl) - orthoformate, tris(1H,1H-heptafluorobutyl) - orthoformate, tris(1H,1H-nonafluoropentyl) - orthoformate, tris(1H,1H-undecafluorohexyl)-orthoformate, tris(1H,1H - pentacosfluorotridecyl)-orthoformate, etc.

As an example of the use of the compounds of this invention in organic syntheses, they may be used in making acetals by reaction with aldehydes or ketones, as follows:

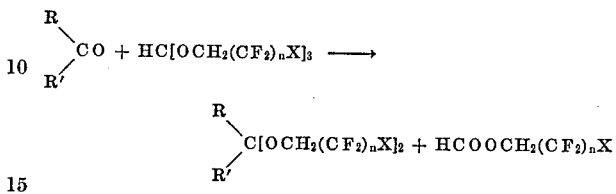

wherein R is lower alkyl, R' is hydrogen or lower alkyl and $n$ and X are as defined above.

In the following examples, the parts and percentages are by weight.

Example 1.—Tris(1H,1H,3H-tetrafluoropropyl)-orthoformate

$(HCF_2CF_2CH_2O)_3CH$

A suitable reaction vessel was charged with 300 parts (2.27 moles) of 1H,1H,3H-tetrafluoro-1-propanol. The flask was purged with nitrogen and externally cooled with ice. After adding 12 parts (0.52 mole) of sodium, the temperature was gradually raised to about 30° C. When the sodium has completely reacted, the temperature was raised to 100° C., and about 30 parts (0.25 mole) of choloroform was slowly added while maintaining a temperature of 108–110° C. The reaction mixture was then refluxed overnight. About 29 parts of salt were separated by filtration, and the clear solution was distilled to recover unreacted chloroform and fluoro alcohol. The residue was then distilled in vacuo to give 38 parts of clear liquid product, boiling at 223° C. under atmospheric pressure.

Example 2.—Tris(1H,1H,7H-dodecafluoroheptyl)-orthoformate

$[H(CF_2)_6CH_2O]_3CH$

About 160 parts of methanol and 12 parts (0.52 mole) of sodium were reacted, and the unreacted methanol was removed by distillation in vacuo. After adding 300 parts (0.905 mole) of 1H,1H,7H-dodecafluoroheptanol and distilling off methanol, the solution was heated to 140° C., and 10 parts (0.084 mole) of chloroform was slowly added at a temperature of 140–145° C. The reaction mixture was held overnight at 140° C. and 25 parts of salt was removed by filtration. The solution was distilled in vacuo giving a fraction boiling at about 120–125° C. under a pressure equivalent to 0.1 mm. of mercury to give about 41 parts of the product.

Example 3.—Tris(1H,1H,9H-hexadecafluorononyl)-orthoformate

$[H(CF_2)_8CH_2O]_3CH$

About 160 parts of methanol and 17 parts (0.74 mole) of sodium were reacted, and the unreacted methanol was removed by distillation in vacuo. After adding 510 parts (1.18 moles) of 1H,1H,9H-hexadecafluorononanol and distillation of methanol at about 160° C. in partial vacuum, 46 parts (0.385 mole) of chloroform was slowly added (16 hours) at a temperature of 190° C. About 140 parts of ether were added to maintain fluidity at room temperature, and the precipitated salt was separated by filtration. The remaining solution was distilled to give 60 parts of product boiling at 130–140° C. under a pressure equivalent to approximately 0.1 mm. of mercury.

I claim:
1. Compounds of the formula:

$$[X(CF_2)_nCH_2O]_3CH$$

where X is a member selected from the group consisting of hydrogen and fluorine and $n$ is a whole number from 1 to 20.
2. Tris(1H,1H-3H-tetrafluoropropyl)-orthoformate.
3. Tris(1H,1H,7H-dodecafluoroheptyl)-orthoformate.
4. Tris(1H,1H,9H - hexadecafluorononyl) - orthoformate.

References Cited

UNITED STATES PATENTS 2,824,141   2/1958   Zismon et al.

LEON ZITVER, *Primary Examiner.*

H. T. MARS, *Assistant Examiner.*